US007031719B2

(12) United States Patent
Miyano et al.

(10) Patent No.: US 7,031,719 B2
(45) Date of Patent: Apr. 18, 2006

(54) METHOD OF CALCULATING EXCITING COEFFICIENTS FOR CIRCULAR ARRAY ANTENNA AND RADIO UNIT UTILIZING THE SAME

(75) Inventors: Kentaro Miyano, Kanagawa (JP); Takashi Fukagawa, Kanagawa (JP); Takaaki Kishigami, Kanagawa (JP); Makoto Hasegawa, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 822 days.

(21) Appl. No.: 09/920,984

(22) Filed: Aug. 2, 2001

(65) Prior Publication Data

US 2002/0068613 A1 Jun. 6, 2002

(30) Foreign Application Priority Data

Aug. 2, 2000 (JP) ............................ 2000-234444
Jul. 18, 2001 (JP) ............................ 2001-218006

(51) Int. Cl.
*H04Q 7/20* (2006.01)

(52) U.S. Cl. ................................ 455/452.1; 455/562.1

(58) Field of Classification Search ............ 455/452.1, 455/562.1
See application file for complete search history.

(56) References Cited

U.S. PATENT DOCUMENTS 5,936,577 A 8/1999 Shoki et al. ................ 342/373
6,529,745 B1 * 3/2003 Fukagawa et al. ....... 455/562.1
6,788,661 B1 * 9/2004 Ylitalo et al. ............... 370/334
6,795,424 B1 * 9/2004 Kapoor et al. .............. 370/343

FOREIGN PATENT DOCUMENTS

EP 0 227 910 A 7/1987
EP 837523 4/1998
EP 1 079 461 A 2/2001
JP 10126139 5/1998

OTHER PUBLICATIONS

"Pattern Synthesis of Circular Arrays with Many Directive Elements", pp. 758-759, IEEE Transactions On Antennas and Propagation, Nov. 1968.

(Continued)

*Primary Examiner*—Ahmad F. Matar
*Assistant Examiner*—Quynh H. Nguyen
(74) *Attorney, Agent, or Firm*—RatnerPrestia

(57) ABSTRACT

A method of calculating coefficients determining excitation amplitudes and phases for obtaining a desired antenna pattern of a circular array antenna comprising a plurality of antenna elements disposed circularly. Coefficients for a linear array antenna having the same number of antenna elements as the circular array antenna are determined by a Fourier series expansion in integral limits calculated from a beam direction and a beam width that are estimated from incoming radio waves and then are transformed into the coefficients for the circular array antenna. With this method, the beam direction and the beam width of the antenna pattern of the circular array antenna can be set at will. Consequently, this method enables adaptive control of sectored beams of sectored antennas at a base station or the like used for a mobile communication system, thus enhancing efficiency of the use of the antennas.

23 Claims, 9 Drawing Sheets

OTHER PUBLICATIONS

"An Adaptive Zone Configuration System Using Array Antennas" by Kazuo Kubotta et al. pp. 53-58, Technical Report of IEICE. Sep. 1995.

F. I. Teng, D. K. Cheng: "pattern synthesis of circular arrays with many directive elements"; IEEE Transactions on Antennas and Propagation, vol. 16, (Nov. 1968), pp. 758-759.

Tewfik A H et al: "On the equivalence of uniform circular arrays and uniform linear arrays"; IEEE, (Oct. 10, 1990), pp. 139-143.

Kubota K et al: "An Adaptive Zone Configuration System Using Array Antennas"; Denshi Joho Tsushin Gakkai Gijutsu Kunkyu Hokoku—IEICE Technical Report, Denshi Joho Tsushin Gakkai, Tokyo, JP, (Sep. 1995), pp. 53-58.

Ares F et al: "Synthesis of antenna patterns of circular arc arrays". Electronics Letters, IEE Stevenage, GB, vol. 32, No. 20, (Sep. 26, 1996), pp. 1845-1846.

European Search Report for EP 01 11 7716, dated Oct. 11, 2004.

* cited by examiner (a) (b) (c)

METHOD OF CALCULATING EXCITING COEFFICIENTS FOR CIRCULAR ARRAY ANTENNA AND RADIO UNIT UTILIZING THE SAME

FILED OF THE INVENTION

The present invention relates to a method of calculating excitation coefficients for a base station antenna used for mobile communications or the like. The present invention also relates to a radio unit utilizing the calculating method.

BACKGROUND OF THE INVENTION

In recent years, the number of users of mobile communications including portable telephones has grown remarkably, presenting a problem of how to effectively use frequencies of radio waves used for transmission and reception. Techniques for the effective use of the frequencies include reduction of the radius of each cell having a base station at its center, antenna sectorization and the like. At present, sectored antennas currently used at the base station each has a fixed antenna pattern. If the antenna pattern of each of the sectored antennas can be adaptively varied, an optimum beam can be formed in accordance with traffic which varies momentarily, so that the effective use of the frequencies becomes feasible.

To adaptively vary the antenna pattern, several pattern synthesis techniques utilizing a circular array antenna (hereinafter sometimes referred to as "circular array") are proposed. For example, the paper entitled "Pattern Synthesis of Circular Arrays with Many Directive Elements" by F. I. Tseng and D. K. Cheng, published in the November 1968 issue of the IEEE Transactions on Antennas and Propagation, vol. AP-16, No. 11, pp. 758–759, discloses a calculating method for transforming excitation coefficients for a linear array antenna (hereinafter sometimes referred to as "linear array") having an odd number of elements into excitation coefficients for a circular array having the same number of elements as the linear array antenna. The method disclosed in this paper, however, is limited to cases where an array antenna has an odd number of elements, not referring to cases where it has an even number of elements.

Another paper entitled "An Adaptive Zone Configuration System using Array Antennas" by Kazuo Kubota, Tsukasa Iwama and Mitsuo Yokoyama, published in the September 1995 issue of Technical Report of IEICE, RCS59–76, discloses a method, utilizing the method described in the above-mentioned paper, for transforming excitation coefficients for a linear array antenna having an odd number of elements into excitation coefficients for a circular array having an even number of elements (one element fewer than the linear array antenna). However, according to this paper, a controlled antenna pattern does not reflect a desired beam direction and a desired beam width, and consequently, a desired antenna pattern cannot be obtained.

SUMMARY OF THE INVENTION

The present invention aims to provide a calculating method and a radio unit utilizing the same, the method being capable of providing an arbitrary antenna pattern with a desired beam direction and a desired beam width for a circular array antenna.

To calculate excitation coefficients for respective antenna elements forming the circular array antenna, the present invention establishes a calculating method for transforming excitation coefficients for a linear array antenna having an even number of antenna elements into excitation coefficients for a circular array antenna having the same number of elements as the linear array antenna. The present invention can also provide an arbitrary antenna pattern with a desired beam direction and a desired beam width by calculating the coefficients for the linear array antenna through the use of values calculated from the beam direction and the beam width of the desired antenna pattern and transforming the calculated coefficients for the linear array antenna into coefficients for the circular array antenna.

DESCRIPTION OF THE PREFERRED EMBODIMENTS

Exemplary embodiments of the present invention are demonstrated hereinafter with reference to the accompanying drawings.

First Exemplary Embodiment

The first exemplary embodiment details a calculating method applied to cases where the number of antenna elements is even (2M).

Figure 1:
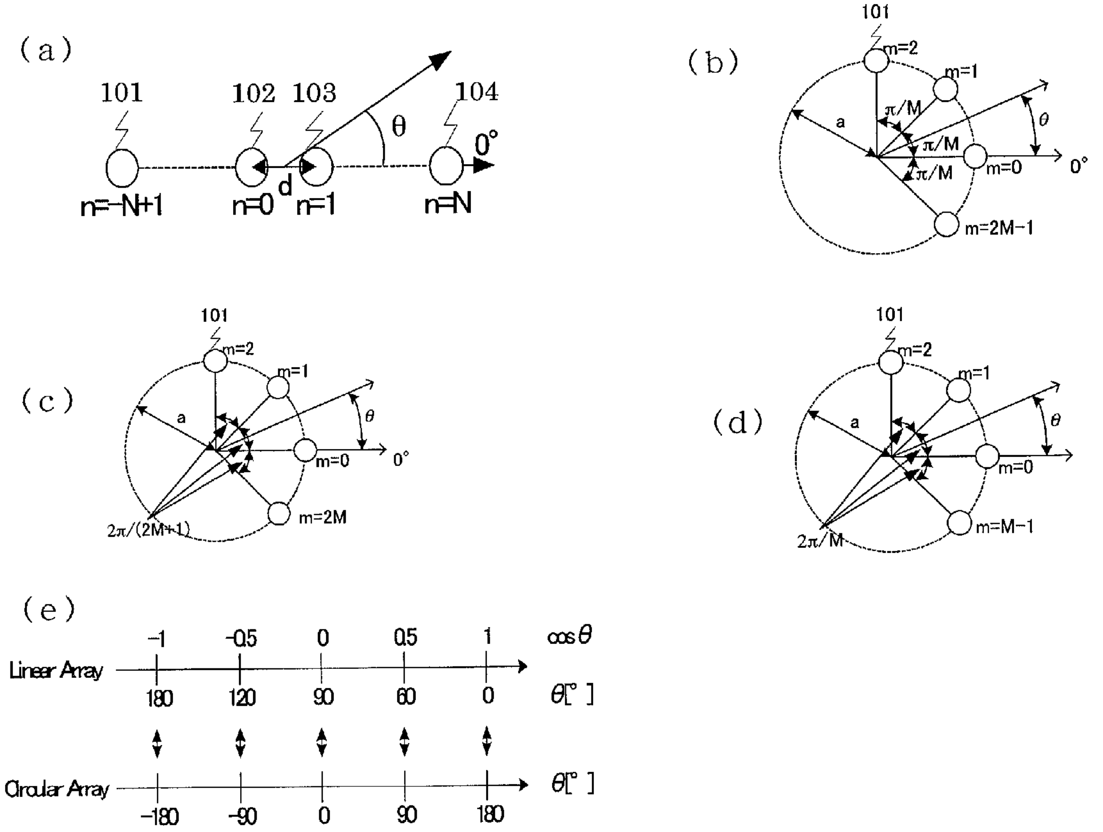
FIG. 1 illustrates relationships between arrangements of antenna elements of array antennas and beam directions for explaining the present invention, with FIG. 1(*a*) illustrating a relationship between an arrangement of antenna elements of a linear array antenna and a beam direction, FIG. 1(*b*) illustrating a relationship between an arrangement of antenna elements, the number of which is even, of a circular array antenna and a beam direction, FIG. 1(*c*) illustrating a relationship between an arrangement of antenna elements, the number of which is odd, of a circular array antenna and a beam direction, FIG. 1(*d*) illustrating a relationship between an arrangement of an arbitrary number of antenna elements of a circular array antenna and a beam direction and FIG. 1(*e*) illustrating a relationship between a beam direction and a beam width when coefficients for a linear array antenna are transformed into coefficients for a circular array antenna.

FIG. 1(*a*) shows an arrangement of antenna elements, the number of which is even (2N), of a linear array antenna. In FIG. 1(*a*), 2N antenna elements 101, 102, 103, 104 are disposed on a straight line at intervals of distance d with antenna element 101 disposed at n=−N+1. Array factor $E_0(\theta)$ representing an antenna pattern of this linear array antenna, generally, can be expressed as:

$$E_0(\theta)=\sum_{n=-N+1}^{N} B_n e^{j\frac{2\pi d}{\lambda 2}(2n-1)\cos\theta} \tag{1}$$

or $$E_0(\theta)=\sum_{n=-N}^{N-1} B_n e^{j\frac{2\pi d}{\lambda 2}(2n-1)\cos\theta} \tag{2}$$

where $B_n$ designates an amplitude and a phase of antenna element n, d is a spacing between the antenna elements, θ is an angle between a beam direction of the antenna pattern and a direction of the linear array (the direction of 0°), and λ is a wavelength of an using radio wave.

Equation (1) applies to the case of FIG. 1(*a*) where first antenna element 101 is at n=−N+1, while final antenna element 104 is at n=N, and Equation (2) applies to cases where a first antenna element is at n=−N, while a final antenna element is at n=N−1. The following description refers to the case of equation (1).

An arrangment of antenna elements, the number of which is even (2M), of a circular array antenna is shown in FIG. 1(*b*), in which antenna elements 101 are disposed counter-clockwise at uniform angular intervals of λ/M along a circle with radius a. Specifically, first antenna element 101 is disposed at m=0 (an origin point in the direction of 0°), and subsequent antenna elements 101 are disposed at m=1, m=2, . . . , m=2M−1, respectively. In this case, array factor $E_0(\theta)$ can be expressed as:

$$E_0(\theta)=\sum_{m=0}^{2M-1} A_m e^{j\frac{2\pi}{\lambda}a\cos\left(\theta-\frac{m}{M}\pi\right)} \tag{3}$$

where $A_m$ designates an amplitude and a phase of antenna element m, a is the radius of the circle, θ is an angle between a beam direction of the antenna pattern and the direction of 0°, and λ is a wavelength of an using radio wave.

Generally, a Fourier transform can be expressed by:

$$B_n=\frac{1}{2\pi}\int_{-\pi}^{\pi} E_0(\theta)e^{-jn\theta}d\theta \tag{4}$$

and $$E_0(\theta)=\sum_{n=-N+1}^{N} B_n e^{jn\theta} \tag{5}$$

Assuming that equation (1) is equation (5), from equations (1), (3) and (5); we obtain:

$$\sum_{m=0}^{2M-1} A_m e^{j\frac{2\pi}{\lambda}a\cos\left(\theta-\frac{m}{M}\pi\right)}=\sum_{n=-N+1}^{N} B_n e^{jn\theta} \tag{6}$$

Substitution of the left side of equation (6) into equation (4) yields:

$$B_n=\frac{1}{2\pi}\int_{-\pi}^{\pi}\sum_{m=0}^{2M-1} A_m e^{j\frac{2\pi}{\lambda}a\cos\left(\theta-\frac{m}{M}\pi\right)}e^{-jn\theta}d\left(\theta-\frac{m}{M}\pi\right) \tag{7}$$

When $$\theta-\frac{m}{M}\pi=\varphi,$$

equation (7) becomes:

$$B_n=\alpha_n\sum_{m=0}^{2M-1} A_m e^{-jn\frac{m}{M}\pi} \tag{8}$$

where $$\alpha_n=\frac{1}{2\pi}\int_{-\pi}^{\pi} e^{j\left(\frac{2\pi}{\lambda}a\cos\varphi-n\varphi\right)}d\varphi$$

Dividing both sides of equation (8) by $\alpha_n$ yields:

$$\frac{B_n}{\alpha_n}=\sum_{m=0}^{2M-1} A_m e^{-jn\frac{m}{M}\pi} \tag{9}$$

Equation (9) expressed in matrix form is as follows:

$$\begin{matrix} n=-N+1, m=0 \\ n=-N+2, m=1 \\ \vdots \\ n=N, m=2M-1 \end{matrix} \begin{pmatrix} \frac{B_{-N+1}}{\alpha_{-N+1}} \\ \frac{B_{-N+2}}{\alpha_{-N+2}} \\ \vdots \\ \frac{B_N}{\alpha_N} \end{pmatrix} = \begin{pmatrix} e^{-j(-N+1)\frac{0}{M}\pi} & \dots & e^{-j(-N+1)\frac{2M-1}{M}\pi} \\ e^{-j(-N+2)\frac{0}{M}\pi} & \dots & e^{-j(-N+2)\frac{2M-1}{M}\pi} \\ \vdots & \ddots & \vdots \\ e^{-jN\frac{0}{M}\pi} & \dots & e^{-jN\frac{2M-1}{M}\pi} \end{pmatrix} \begin{pmatrix} A_0 \\ A_1 \\ \vdots \\ A_{2M-1} \end{pmatrix} \tag{10}$$

As expressed above, equation (10) can be expressed in [C]=[E]×[A] form. Here, [A] can be obtained by multiplying both sides by inverse matrix $[E]^{-1}$, which is the inverse of [E]. [A] denotes the amplitude and phase of each antenna element, so that the amplitude and phase of each element of the circular array antenna can be obtained.

Alternatively, introduction of Kronecker delta can yield [A] which is concretely expressed as:

$$A_m = \frac{1}{2N}\sum_{n=-N+1}^{N}\frac{B_n}{\alpha_n}e^{-jn\frac{m}{N}\pi} \tag{11}$$

Figure 2:
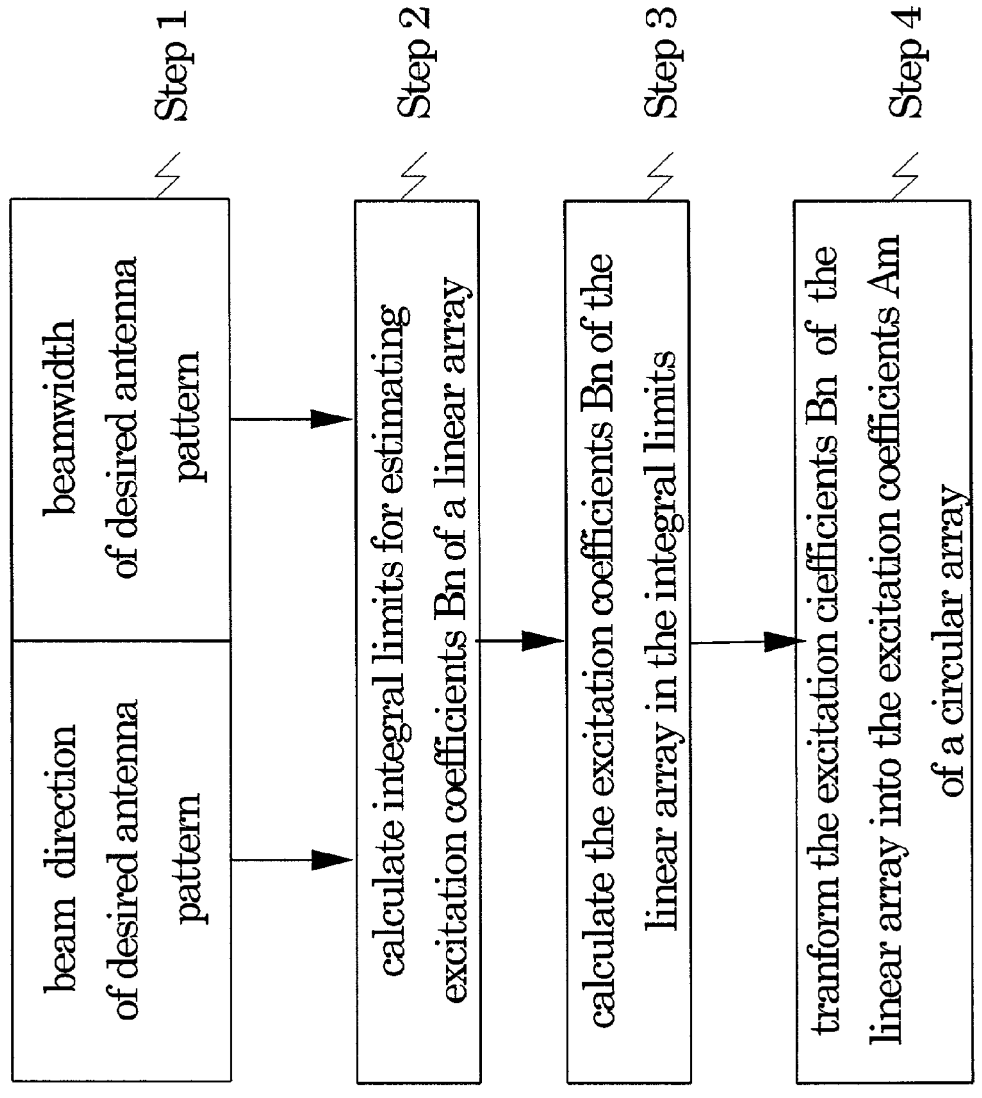
FIG. 2 is a flow chart illustrating a method of calculating excitation coefficients for a circular array antenna in accordance with the present invention.

In the present invention, for the purpose of controlling an antenna pattern of a circular array antenna through the introduction of a desired beam direction and a desired beam width based on the above-described calculating method, integral limits are set when excitation coefficients $B_n$ for a linear array are calculated according to equation (1), and based on the coefficients $B_n$, excitation coefficients for the circular array antenna are calculated. The procedure is explained with reference to FIG. 2.

In step 1, a beam direction and a beam width are set for a desired antenna pattern. The beam direction and the beam width can be determined in real time in accordance with traffic conditions. Alternatively, corresponding with a desired coverage of the circular array antenna, they can be set through previous estimation of the traffic conditions, stored in a storage unit such as a table memory or the like and read therefrom. The detail is described later.

In step 2, integral limits are calculated for the calculation of excitation coefficients for a linear array antenna. When a circular array and the linear array have respective arrangements like those shown in FIGS. 1(*b*) and 1(*a*), with d being, for example, 0.5 λ, a relationship between the beam direction and the beam width of the circular array and those of the linear array becomes like the one shown in FIG. 1(*e*). For instance, a beam (defined by −90° and 90°) with a beam direction of 0° and a beam width of 180° of the circular array corresponds to a beam (defined by 120° and 60°) with a beam direction of 90° and a beam width of 60° of the linear array. Since cos θ serves as a parameter when coefficients $B_n$ for the linear array are actually determined, the integral limits become −0.5 and 0.5 (cos 120° and cos 60).

When d is not 0.5 λ, values each obtained by multiplying cos θ by λ/2d become integral limits. A summary of the above-described relations can be expressed as:

$$r_0 = \frac{2\times D+W}{360}\times\frac{\lambda}{2d} \text{ and} \tag{12}$$

$$r_1 = \frac{2\times D-W}{360}\times\frac{\lambda}{2d} \tag{13}$$

where D and W are a beam direction and a beam width, respectively and serve as parameters for a desired antenna pattern of the circular array antenna, d is a spacing between antenna elements, and A is a wavelength of an using radio wave. When, for example, d is 0.5 λ, $r_0$=(2×D+W)/360, and $r_1$=(2×D−W)/360.

In step 3, with the use of equations (12) and (13), excitation coefficients $B_n$ for the linear array antenna are calculated according to equation (1). With the integral limits set at $r_1$ and $r_0$ and array factor $E_0(\theta)$ set at 1 in the integral limits, excitation coefficients $B_n$ in equation (1) are determined by an inverse Fourier transform. Thus, $B_n$ can be expressed as:

$$B_n = \frac{d}{\lambda}\int_{r_1}^{r_0} 1 e^{-j\frac{2\pi}{\lambda}\frac{d}{2}(2n-1)x}dx \tag{14}$$

In Step 4, $B_n$ obtained is applied to equations (3) to (11), and consequently, excitation coefficients $B_n$ for the linear array antenna are transformed into excitation coefficients $A_m$ for the circular array antenna. Owing to the amplitudes and the phases denoted by excitation coefficients $A_m$ obtained, an antenna pattern of the excited circular array antenna thus has a desired beam direction and a desired beam width.

The above description has referred to cases where radiant power of the antenna is not varied. However, the power can be varied by setting $E_0(\theta)$ at a value other than 1 in the interval between $r_1$ and $r_0$.

As described above, according to the present embodiment, a desired antenna pattern defined by an arbitrary beam direction and an arbitrary beam width can be obtained for a circular array antenna having an arbitrary even number of antenna elements.

Through use of cos(D−W/2) and cos(D+W/2) in place of equations (12) and (13), a desired antenna pattern defined by an arbitrary beam direction and an arbitrary beam width can be obtained for the linear array, provided that as shown in FIG. 1(*a*), the linear array is arranged in the direction of the origin point (the direction of 0°). If the direction of 0° changes, the integral limits and the array factor need to be reset accordingly.

In cases where the formation of beams in a plurality of directions is desired, a plurality of sets of integral limits may be prepared by the use of equations (12) and (13). For example, in the case of two directions, an interval between $r_{1a}$ and $r_{0a}$ and an interval between $r_{1b}$ and $r_{0b}$ may be prepared. In cases where a plurality of beams of different powers are desired, array factor $E_0(\theta)$ may be varied according to each beam when coefficients $B_n$ in the equation (1) are determined. For example, in the case of two directions, factors $E_0(\theta)$ may be set at 1 in the interval between $r_{1a}$ and $r_{0a}$ and at 0.5 in the interval between $r_{1b}$ and $r_{0b}$.

Figure 3:
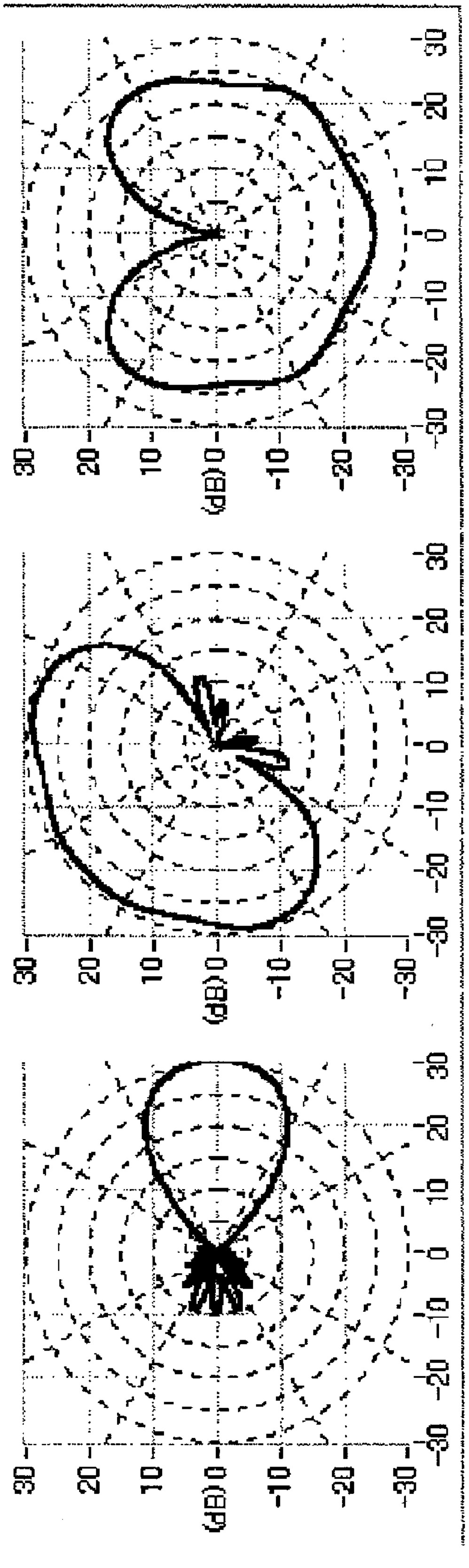
FIGS. 3(*a*)–3(*c*) illustrate antenna patterns of a circular array antenna in accordance with the present invention.

FIG. 3 illustrates antenna patterns, formed according to the above-described method, of a circular array antenna comprising twelve elements arranged at intervals of 0.5 λ. FIG. 3(*a*) shows an antenna pattern with a beam direction of 0° and a beam width of 60°, FIG. 3(*b*) shows an antenna pattern with a beam direction of 135° and a beam width of 180°, and FIG. 3(*c*) shows an antenna pattern with a beam direction of 270° and a beam width of 300°.

Second Exemplary Embodiment

The second exemplary embodiment details a calculating method applied to cases where the number of antenna elements is odd (2M+1).

FIG. 1(*c*) shows an arrangement of antenna elements, the number of which is odd, of a circular array antenna. Antenna elements 101 are disposed counterclockwise at uniform angular intervals of 2π/(2M+1) along a circle with radius a. Specifically, first antenna element 101 is disposed at m=0 (an origin point in the direction of 0° ), and subsequent antenna elements 101 are disposed at m=1, m=2, . . . , m=2M, respectively. The present embodiment differs from the first exemplary embodiment in that a different equation is used for finding an array factor.

When the number of antenna elements of a linear array antenna is 2N+1, array factor $E_0(\theta)$ can be expressed as:

$$E_0(\theta)=\sum_{n=-N}^{N}B_n e^{j\frac{2\pi}{\lambda}nd\cos\theta} \quad (15)$$

where $B_n$ designates an amplitude and a phase of antenna element n, d is a spacing between the antenna elements, θ is an angle between a beam direction of the antenna pattern and a direction of the linear array (the direction of 0° ), and λ is a wavelength of an using radio wave.

When the number of antenna elements of the circular array antenna is 2M+1, array factor $E_0(\theta)$ is expressed as:

$$E_0(\theta)=\sum_{m=0}^{2M}A_m e^{j\frac{2\pi}{\lambda}a\cos\left(\theta-\frac{2m}{2M+1}\pi\right)} \quad (16)$$

where $A_m$ designates an amplitude and a phase of antenna element m, a is the radius of the circle, θ is an angle between a beam direction of the antenna pattern and the direction of 0°, and λ is a wavelength of an using radio wave.

In accordance with the present embodiment, only the replacement of equation (1) with equation (15) and the replacement of equation (3) with equation (16) are done as described above, and the rest of the calculating method is carried out in the same manner as in the first exemplary embodiment. Consequently, an arbitrary antenna pattern defined by an arbitrary beam direction and an arbitrary beam width can be obtained for a circular array antenna having an arbitrary odd number of antenna elements.

Third Exemplary Embodiment

The third exemplary embodiment details a method of calculating excitation coefficients for a circular array antenna having an arbitrary number of antenna elements. FIG. 1(*d*) shows an arrangement of antenna elements, the number of which is arbitrary (M), of a circular array antenna. Antenna elements 101 are disposed counterclockwise at uniform angular intervals of 2πfM along a circle having radius a with first antenna element disposed at an origin point (in the direction of 0°).

The present embodiment differes from the first exemplary embodiment in that a different equation is used for finding an array factor. When the number of antenna elements of a linear array is N, array factor $E_0(\theta)$ can be expressed as:

$$E_0(\theta)=\sum_{n=0}^{N-1}B_n e^{j\frac{2\pi}{\lambda}nd\cos\theta} \quad (17)$$

When N is an even number, that is, N=2L, array factor $E_0(\theta)$ can be expressed as:

$$E_0(\theta)=\sum_{n=-L+1}^{L}B_n e^{j\frac{2\pi}{\lambda}nd\cos\theta} \text{ or } \sum_{n=-L}^{L-1}B_n e^{j\frac{2\pi}{\lambda}nd\cos\theta} \quad (18)$$

When N is an odd number, that is, N=2L+1, array factor $E_0(\theta)$ can be expressed as:

$$E_0(\theta)=\sum_{n=-L}^{L}B_n e^{j\frac{2\pi}{\lambda}nd\cos\theta} \quad (19)$$

When the number of elements of a circular array is M, array factor $E_0(\theta)$ can be expressed as:

$$E_0(\theta)=\sum_{m=0}^{M-1}A_m e^{j\frac{2\pi}{\lambda}a\cos\left(\theta-\frac{2m}{M}\pi\right)} \quad (20)$$

As described above, only the replacement of equation (1) with (17) or (18) or (19) and the replacement of equation (3) with equation (20) are done, and the rest of the calculating method is carried out in the same manner as in the first exemplary embodiment.

Consequently, a desired antenna pattern defined by an arbitrary beam direction and an arbitrary beam width can be obtained for a circular array antenna having an arbitrary number of antenna elements.

Fourth Exemplary Embodiment

The fourth exemplary embodiment details a receiver employing the method of calculating excitation coefficients for a circular array antenna in accordance with any one of the first, second and third exemplary embodiments.

Figure 4:
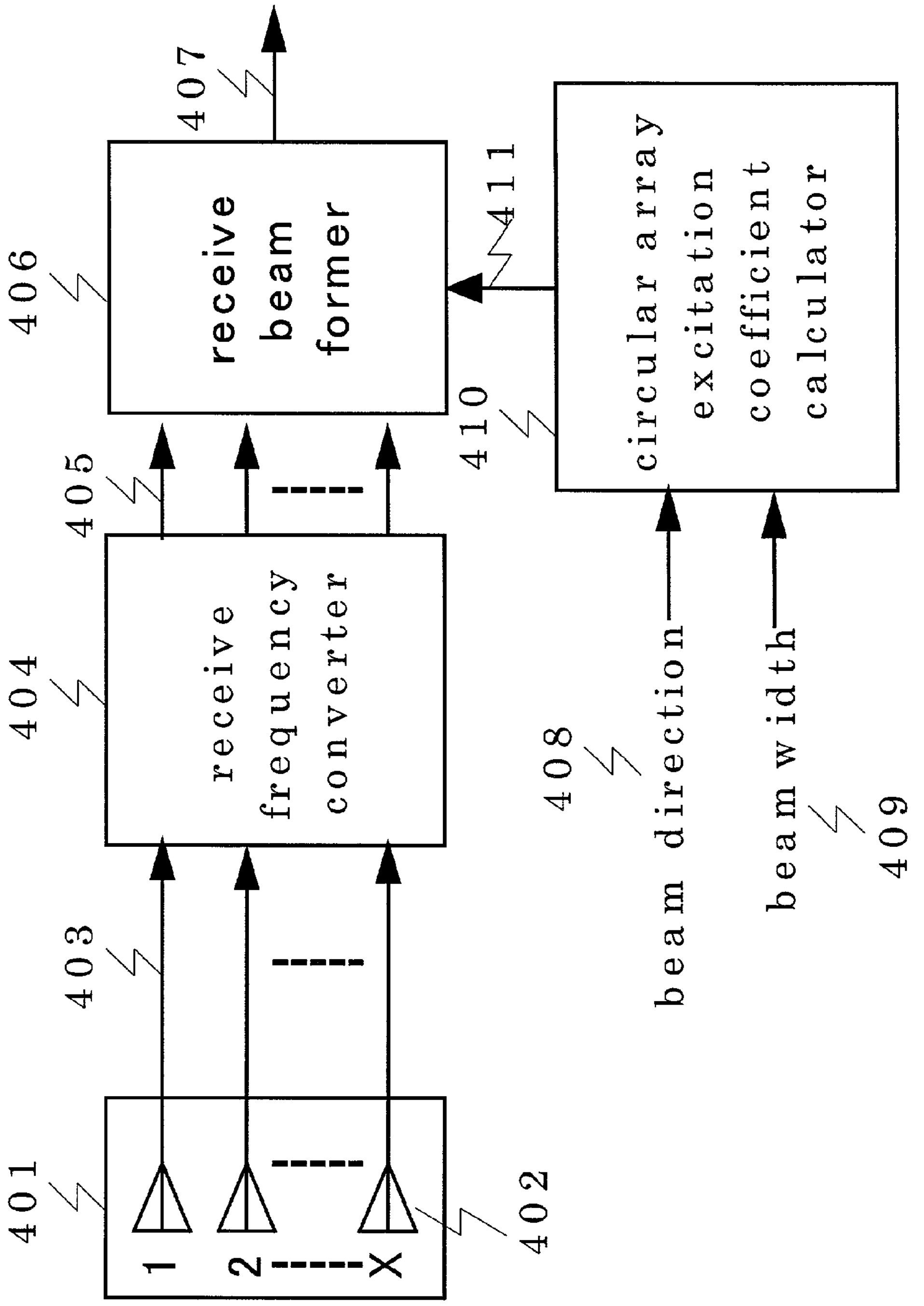
FIG. 4 is a block diagram of a receiver, employing the method of calculating excitation coefficients for a circular array antenna, in accordance with the present invention.

FIG. 4 is a block diagram of the receiver in accordance with the present embodiment.

Receive array antenna 401 is comprised of a plurality of receive antenna elements 402 disposed circularly. Radio frequency signals 403 received by respective antenna elements 402 are input to receive frequency converter 404 which in turn converts signals 403 to either intermediate frequency signals 405 or baseband signals 405 and outputs signals 405 to receive beam former 406.

Circular array antenna excitation coefficient calculator 410 calculates circular array excitation coefficients 411 for forming a desired antenna pattern defined by beam direction 408 and beam width 409 which are input thereto and outputs coefficients 411 to beam former 406. Beam former 406 performs beam forming by multiplying each signal 405 by corresponding coefficient 411 and combining resultant signals, and outputs received signal 407. With this structure, a desired receive antenna pattern defined by an arbitrary beam direction and an arbitrary beam width can be obtained.

Figure 5:
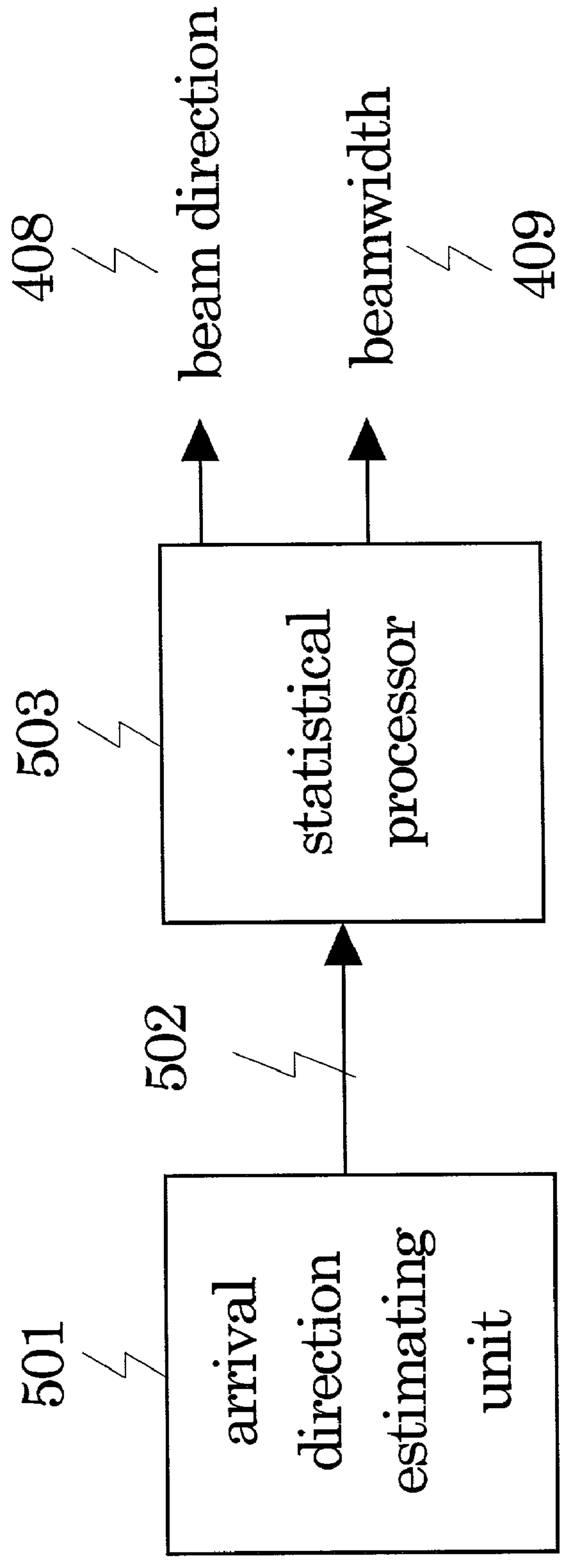
FIG. 5 is a block diagram of a structure for calculating a beam direction and a beam width in accordance with the present invention.

FIG. 5 is a block diagram of a structure for determining beam direction 408 and beam width 409 which are to be input to calculator 410. Radio waves which are transmitted from and received by a circular array antenna are received by and transmitted from a respective plurality of mobile units such as portable telephones that are present in a territory of the circular array. Since these mobile units move freely in the territory, beam directions 408 and beam widths 409 for a desired antenna pattern vary momentarily according to the number of mobile units and positions thereof.

For the determination of beam direction 408 and beam width 409, arrival direction estimating unit 501 estimates beam directions of incoming radio waves in relation to momentarily varying traffic. Specifically, estimating unit 501 successively determines results 502 of the estimations of arrival directions of incoming radio waves arriving from various directions and outputs results 502 to statistical processor 503. Statistical processor 503 statistically processes results (traffic conditions) 502 to determine beam direction 408 and beam width 409. Thus, beam direction 408 and beam width 409 can be determined in real time for a desired antenna pattern coincident with the current condition of traffic. Based on beam direction 408 and beam width 409 thus determined, excitation coefficients for the circular array antenna are calculated pursuant to the steps shown in FIG. 2 for the formation of a receive beam. Consequently, an adaptive antenna adapted to traffic can be achieved.

Instead of being determined in real time in the manner shown in FIG. 5, beam direction 408 and beam width 409, which are to be input to circular array antenna excitation coefficient calculator 410, can be set through previous estimation of the traffic conditions, stored in a storage unit such as a table memory or the like and read therefrom.

Fifth Exemplary Embodiment

Figure 6:
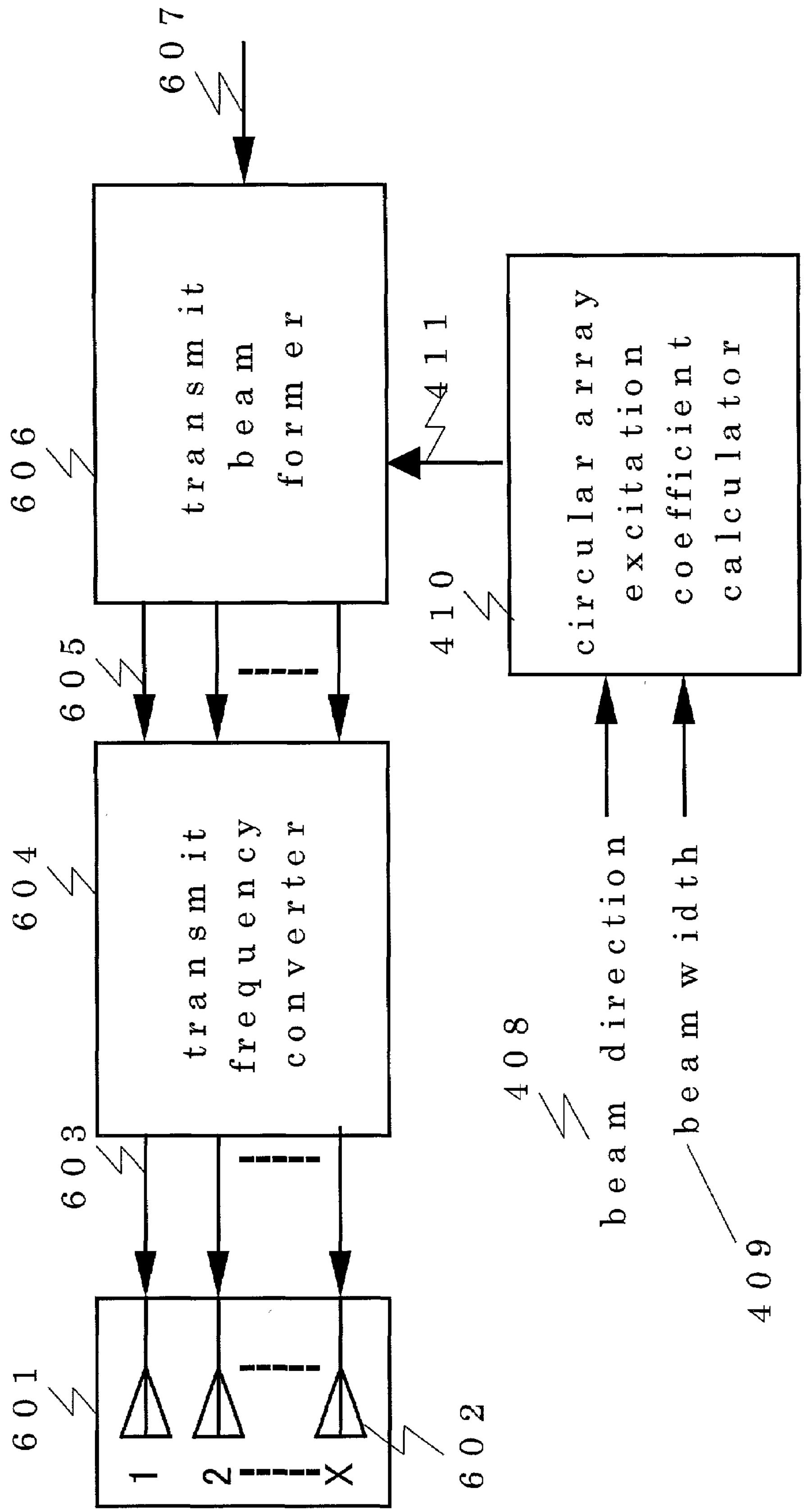
FIG. 6 is a block diagram of a transmitter, employing the method of calculating excitation coefficients for a circular array antenna, in accordance with the present invention.

The fifth exemplary embodiment details a transmitter employing the method of calculating excitation coefficients for a circular array antenna in accordance with any one of the first, second and third exemplary embodiments. FIG. 6 is a block diagram of the transmitter in accordance with the present embodiment.

Transmit array antenna 601 is comprised of a plurality of transmit antenna elements 602 disposed circularly. Circular array antenna excitation coefficient calculator 410 shown in FIG. 6 is of the same structure as that of circular array antenna excitation coefficient calculator 410 shown in FIG. 4, calculates circular array antenna excitation coefficients 411 for the formation of a desired antenna pattern defined by an arbitrary beam direction and an arbitrary beam width and outputs coefficients 411 to transmit beam former 606. A method of determining beam direction 408 and beam width 409 is the same as that of the fourth exemplary embodiment.

Transmitted signal 607 input to beam former 606 is split into signals, the number of which is the same as the number of antenna elements 602. The split signals are multiplied by excitation coefficients 411, respectively and then converted to either intermediate frequency signals 605 or baseband signals 605 which are output to transmit frequency converter 604. Frequency converter 604 converts signals 605 to transmit radio frequency signals 603 and outputs signals 603 to array antenna 601. Thus, a desired transmit antenna pattern defined by an arbitrary beam direction and an arbitrary beam width can be obtained.

Sixth Exemplary Embodiment

The sixth exemplary embodiment details a receiver which is the same as that of the fourth exemplary embodiment except that it has no receive frequency converter 404.

Radio frequency signals 403 received by receive array antenna 401 are input to receive beam former 406. Beam former 406 performs beam forming by multiplying each input signal 403 by corresponding circular array antenna excitation coefficient 411 and combining resultant signals and outputs received signal 407. With this structure, the signals input to beam former 406 are not limited to intermediate frequency signals or baseband signals and hence are usable as firsthand high frequency signals.

Seventh Exemplary Embodiment

The seventh exemplary embodiment details a transmitter which is the same as that of the fifth exemplary embodiment except that it has no transmit frequency converter 604.

When input to transmit beam former 606, a radio frequency signal, i.e., transmitted signal 607 is split into signals, the number of which is the same as the number of antenna elements 602. The split signals are multiplied by circular array antenna excitation coefficients 411, respectively and then are output. The resultant signals are transmit radio frequency signals 603 which are output from transmit array antenna 601 just as they are. With this structure, the signals output from transmit beam former 606 are not limited to intermediate frequency signals or baseband signals and hence are usable as firsthand high frequency signals.

Eighth Exemplary Embodiment

The eighth exemplary embodiment details a transceiver employing the method of calculating excitation coefficients for a circular array antenna in accordance with any one of the first, second and third exemplary embodiments.

Figure 7:
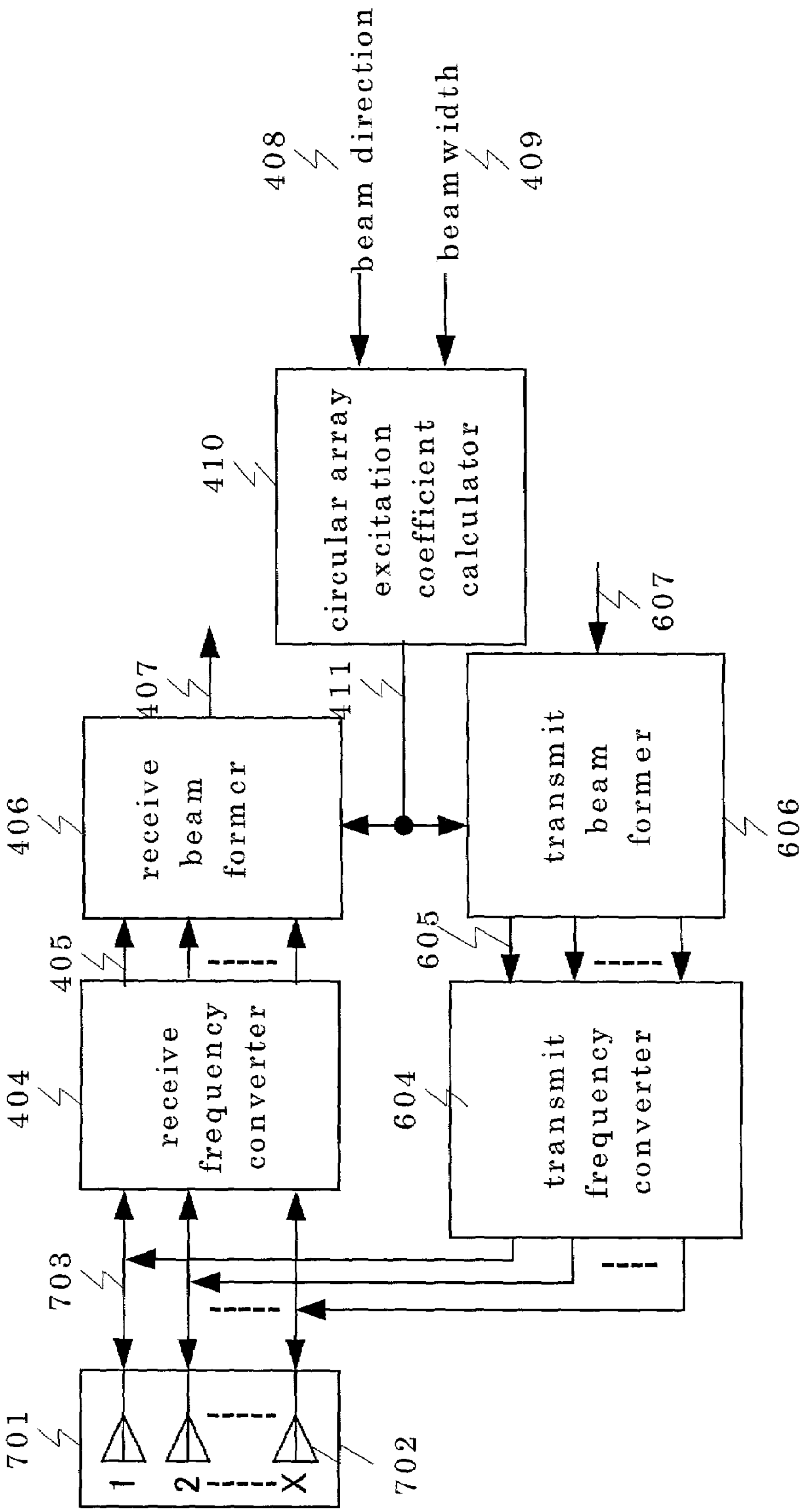
FIG. 7 is a block diagram of a transceiver, employing the method of calculating excitation coefficients for a circular array antenna, in accordance with the present invention.

FIG. 7 is a block diagram of the transceiver in accordance with the present embodiment. In FIG. 7, respective structures of receive frequency converter 404, receive beam former 406 and circular array antenna excitation coefficient calculator 410 are identical with those of corresponding parts of FIG. 4, and transmit frequency converter 604 and transmit beam former 606 are identical with those of corresponding parts FIG. 6. A method of determining beam direction 408 and beam width 409 is the same as that of the fourth exemplary embodiment.

Transmit/receive array antenna 701 is comprised of a plurality of transmit/receive antenna elements 702 disposed circularly. Calculator 410 calculates circular array antenna excitation coefficients 411 for the formation of a desired antenna pattern defined by an arbitrary beam direction and an arbitrary beam width and outputs coefficients 411 to both receive and transmit beam formers 406, 606. It should be noted that a desired transmit antenna pattern and a desired receive antenna pattern need not be the same.

Radio frequency signals 703 received by array antenna 701 are input to receive frequency converter 404 which in turn converts signals 703 to either intermediate frequency signals 405 or baseband signals 405. Receive beam former 406 performs beam forming by multiplying each signal 405 by corresponding coefficient 411 and combining resultant signals, and outputs received signal 407.

For transmission, transmitted signal 607 input to transmit beam former 606 is split into signals, the number of which is the same as the number of antenna elements 702. The split signals are multiplied by coefficients 411, respectively and then converted to either intermediate frequency signals 605 or baseband signals 605 which are output to transmit frequency converter 604. Converter 604 converts signals 605 to transmit radio frequency signals 703 which are transmitted from array antenna 701.

With the structure of the present embodiment, a single transmit/receive array antenna enables the formation of a desired transmit antenna pattern, defined by an arbitrary beam direction and an arbitrary beam width, and which is the same as or different from a desired receive antenna pattern defined by an arbitrary beam direction and an arbitrary beam width.

Transmit/receive array antenna 701 can perform both transmission and reception if a band of transmit radio frequencies is close to a band of receive radio frequencies. However, array antenna 701 cannot perform both transmission and reception if the transmit radio frequency band is apart from the receive radio frequency band. In this case, a transmit-only array antenna and a receive-only array antenna may be prepared.

Ninth Exemplary Embodiment

The ninth exemplary embodiment details a transceiver, employing the method of calculating excitation coefficients for a circular array antenna in accordance with any one of the first, second and third exemplary embodiments, and which forms a plurality of beams.

Figure 8:
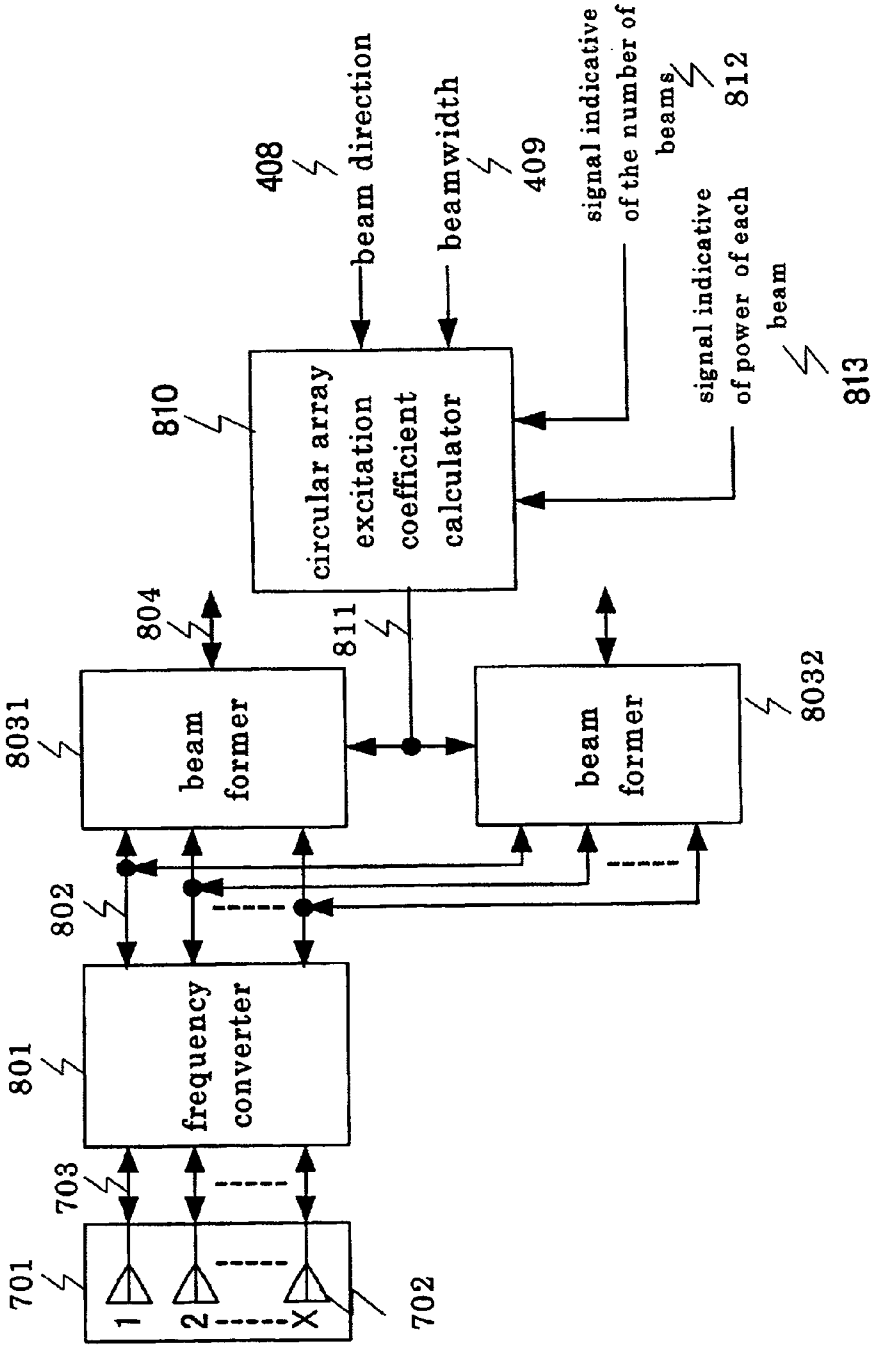
FIG. 8 is a block diagram of a radio unit, employing the method of calculating excitation coefficients for a circular array antenna, for performing transmission and reception based on a plurality of antenna patterns in accordance with the present invention.

FIG. 8 is a block diagram of the transceiver, utilizing a plurality of antenna patterns, in accordance with the present embodiment. Transmit/receive array antenna 701 is identical with that of FIG. 7. The basic structure of circular array antenna excitation coefficient calculator 810 is the same as that of calculator 410 shown in FIG. 4 except that signal 812 indicative of the number of beams to be formed and signal 813 indicative of power of each beam are also input to calculator 810 for the formation of a plurality of beams. The inputs of the number of beams and the power of each beam can be omitted if they are fixed.

A method of determining beam directions 408 and beam widths 409 is the same as that of the fourth exemplary embodiment explained with reference to FIG. 5. For the settings of the number of beams and beam powers, in the present embodiment, statistical processor 503, like the one shown in FIG. 5, outputs, in addition to beam directions 408 and beam widths 409, signal 812 indicative of the number of beams and signal 813 indicative of power of each beam according to directions and powers of incoming radio waves. For instance, when traffic is dense in two directions, signal 812 is output as “2” for the formation of two beams, and signal 813 indicative of power of each of the two beams is also output.

Frequency converter 801 includes the capability of receive frequency converter 404 of the fourth exemplary embodiment and the capability of transmit frequency converter 604 of the fifth exemplary embodiment. Beam formers 8031, 8032, etc. each include the capability of receive beam former 406 of the fourth exemplary embodiment and the capability of transmit beam former 606 of the fifth exemplary embodiment.

Beam formers 8031, 8032, etc. (two beam formers in FIG. 8) are coupled in parallel to frequency converter 801 and are each supplied with coefficients 811 from coefficient calculator 810.

Coefficient calculator 810 calculates coefficients 811 for the formation of each desired antenna pattern defined by an arbitrary beam direction and an arbitrary beam width and outputs sets of coefficients 811 to beam formers 8031, 8032, etc., respectively. Here, the number of sets of coefficients 811 is the same as the designated number of beams. In cases where there are, for example, three beam formers 8031, 8032, 8033, a beam with a direction of 0° and a width of 120°, a beam with a direction of 120° and a width of 120° and a beam with a direction of 240° and a width of 120° can be formed. It should be noted that these antenna patterns need not be the same.

Respective operations of the other parts are identical with those in the fourth exemplary embodiment in the case of reception and those in the fifth exemplary embodiment in the case of transmission, so that their explanations are omitted.

With the structure of the present embodiment, transmit/receive array antenna 701 enables the simultaneous formation of a plurality of desired transmit or receive antenna patterns of different types, each of which is defined by an arbitrary beam direction and an arbitrary beam width as well as the simultaneous formation of desired transmit antenna patterns of different types and desired receive antenna patterns of different types. Since a plurality of antenna patterns can be formed at a single frequency, the present embodiment is applicable to Code Division Multiple Access (CDMA) and Time Division Multiple Access (TDMA).

Moreover, circular array antenna excitation coefficient calculators 810 can be coupled to beam formers 8031, 8032, etc., respectively.

Tenth Exemplary Embodiment

The tenth exemplary embodiment details a transceiver, employing the method of calculating excitation coefficients for a circular array antenna in accordance with any one of the first, second and third exemplary embodiments, and which forms a plurality of beams of different frequencies.

Figure 9:
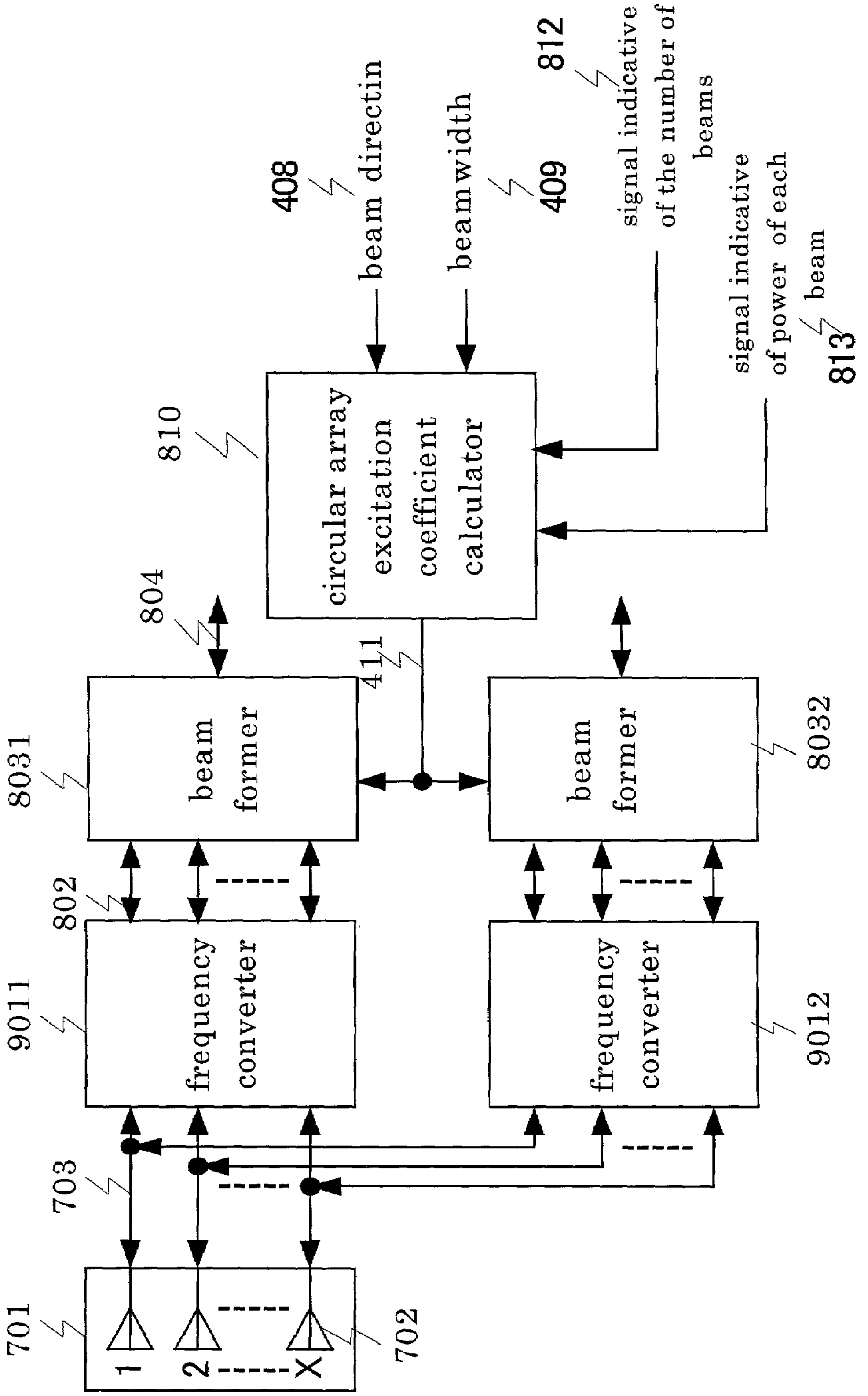
FIG. 9 is a block diagram of a radio unit, employing the method of calculating excitation coefficients for a circular array antenna, for performing transmission and reception based on a plurality of antenna patterns of different frequencies in accordance with the present invention.

FIG. 9 is a block diagram of the transceiver, utilizing a plurality of antenna patterns of different frequencies, in accordance with the present embodiment. Respective structures of circular array antenna excitation coefficient calculator 810 and beam formers 8031, 8032, etc. are identical with those of corresponding parts of the ninth exemplary embodiment.

FIG. 9 differs from FIG. 8 in that a plurality of frequency converters 9011, 9012, etc., the number of which is the same as the number of beam formers 8031, 8032, etc., are coupled in parallel to transmit/receive array antenna 701.

Respective operations of excitation coefficient calculator 810 and beam formers 8031, 8032, etc. are identical with those of the ninth exemplary embodiment explained with reference to FIG. 8. A method of determining beam directions 408 and beam widths 409 is the same as that of the fourth exemplary embodiment.

For reception, frequency converters 9011, 9012, etc. each convert signals received by transmit/receive array antenna 701 to either intermediate frequency signals 802 or baseband signals 802 so that signals 802 of each frequency converter can have frequencies different from those of signals 802 of the other frequency converters and output signals 802 to corresponding beam formers 8031, 8032, etc. For transmission, frequency converters 9011, 9012, etc. convert signals fed from corresponding beam formers 8031, 8032, etc. to transmit radio frequency signals 703 so that signals 703 of each frequency converter can have frequencies different from those of signals 703 of the other frequency converters and output signals 703 to array antenna 701.

In cases where there are, for example, three beam formers 8031, 8032, 8033 and three frequency converters 9011, 9012, 9013, a beam with a direction of 0° and a width of 120°, a beam with a direction of 120° and a width of 120° and a beam with a direction of 240° and a width of 120° can be formed at frequencies $f_0$, $f_1$, $f_2$, respectively. Thus, transmit/receive antenna 701 enables the simultaneous formation of a plurality of transmit or receive antenna patterns of different frequencies, different beam directions and different beam widths. Consequently, the above-described structure can replace three sectored antennas currently in use at a base station for portable telephones.

Respective operations of the other parts are identical with those in the ninth exemplary embodiment, so that their explanations are omitted.

For settings of the number of beams and power of each beam, similarly to the ninth exemplary embodiment, signal 812 indicative of the number of beams and signal 813 indicative of power of each beam are output from statistical processor 503 to coefficient calculator 810.

In accordance with the present embodiment, a plurality of antenna patterns of different frequencies can be formed, so that the present embodiment is applicable to Frequency Division Multiple Access (FDMA).

As described above, according to the present invention, a circular array antenna enables the formation of a desired antenna pattern defined by two parameters, that is, an arbitrary beam direction and an arbitrary beam width, so that an adaptive sectored antenna can be implemented. Consequently, frequencies can be effectively used.

What is claimed is:

1. A method of providing an antenna pattern corresponding to a plurality of antenna elements of a circular array antenna, said method comprising the steps of:
selecting an arbitrary beam width and an arbitrary beam direction for said pattern;
calculating integral limits for estimating excitation coefficients of a linear array based on said selected beam width and beam direction;
calculating said excitation coefficients;
transforming said calculated excitation coefficients into excitation coefficients of a circular array; and
providing said antenna pattern corresponding to said plurality of antenna elements of said circular array antenna according to said selected arbitrary beam width and arbitrary beam direction,
wherein said antenna pattern is provided based upon said excitation coefficients of said circular array.

2. The method of claim 1, wherein at least one of the arbitrary beam direction and the arbitrary beam width for said pattern are determined from incoming radio waves estimated in relation to traffic conditions.

3. The method of claim 1, wherein at least one of the beam direction and the beam width for said pattern are selected from preset values.

4. A method of providing an antenna pattern according to claim 1, wherein said excitation coefficients are calculated by a Fourier series.

5. A receiving system for use with a plurality of antenna elements of a circular array antenna, said receiving system comprising:
a calculator for establishing an antenna pattern corresponding to said plurality of antenna elements of said circular array antenna by calculating excitation coefficients for a linear array antenna based upon an arbitrary beam width and an arbitrary beam direction, and transforming said calculated excitation coefficients into excitation coefficients of a circular array antenna; and
a pathway for effecting signals obtained by use of said circular array antenna based on said established antenna pattern corresponding to said plurality of antenna elements.

6. The receiver of claim 5, further comprising:
a receive frequency converter for converting the radio frequency signals received by the circular array antenna to either intermediate frequency signals or baseband signals,
wherein either the intermediate frequency signals or the baseband signals are multiplied by coefficients calculated by said calculator, respectively, to form resultant signals, and
wherein the resultant signals are combined.

7. The receiver of claim 5, further comprising: an arrival direction estimating unit for estimating arrival directions of incoming radio waves in relation to traffic conditions; and
a statistical processor for statistically processing outputs of the arrival direction estimating unit to determine the beam direction and the beamwidth.

8. The receiver of claim 5, further comprising:
a storage unit for previously storing the beam direction and the beamwidth,
wherein the beam direction and the beamwidth are read from the storage unit.

9. A receiver comprising:
a circular antenna comprising a plurality of antenna elements disposed circularly;
a coefficient calculator for calculating excitation coefficients for the circular array antenna based on a beam direction and a beamwidth of a desired antenna pattern;
a receive frequency converter for converting radio frequency signals received by the circular array antenna to either intermediate frequency signals or baseband signals; and
a plurality of receive beam formers, each of the receive beam formers for respectively multiplying either the intermediate frequency signals or the baseband signals by the coefficients calculated by the coefficient calculator and combining resultant signals,
wherein the receive beam formers are coupled in parallel to the receive frequency converter,
wherein the coefficient calculator is commonly coupled to the receive beam formers, and
wherein the coefficient calculator comprises means for setting the number of beams which is equal to the number of receive beam formers.

10. The receiver of claim 9, wherein the coefficient calculator comprises means for setting an antenna power of each of the beams.

11. A receiver comprising:
a circular array antenna comprising a plurality of antenna elements disposed circularly;
a coefficient calculator for calculating excitation coefficients for the circular array antenna based on a beam direction and a beamwidth of a desired antenna pattern;
a plurality of receive frequency converters, each of the receive frequency converters for converting radio frequency signals received by the circular array antenna to either intermediate frequency signals or baseband signals; and
a plurality of receive beam formers, each of the receive beam formers for respectively multiplying either the intermediate frequency signals or the baseband signals by the coefficients calculated by the coefficient calculator and combining resultant signals,
wherein the receive frequency converter and the receive beam former are coupled in parallel to the circular array antenna,
wherein the coefficient calculator is coupled to the receive beam formers, and
wherein the coefficient calculator comprises means for setting the number of beams which is equal to the number of receive beam formers.

12. The receiver of claim 11, wherein the coefficient calculator comprises means for setting an antenna power of each of the beams.

13. A transmitting system for use with a circular antenna, said transmitting system comprising:
a calculator for establishing an antenna pattern corresponding to a plurality of antenna elements of said circular array antenna by calculating excitation coefficients for a linear array antenna based upon an arbitrary beam width and an arbitrary beam direction, and transforming said calculated excitation coefficients into excitation coefficients of a circular array antenna; and
a pathway for effecting signals to be propagated by use of said circular array antenna based on said established antenna pattern corresponding to said plurality of antenna elements.

14. The transmitter of claim 13, further comprising:
a transmit beam former for splitting a transmit signal into signals, the number of which is the same as the number of antenna elements of the circular array antenna, and respectively multiplying the signals by the coefficients thereby to form transmit beams, transmit frequency converter for converting the transmit beams of the transmit beam former to either intermediate frequency signals or baseband signals, wherein the circular array antenna is excited by either the intermediate frequency signals or the baseband signals of the transmit frequency converter.

15. The transmitter of claim 13, further comprising:

an arrival direction estimating unit for estimating arrival directions of incoming radio waves in relation to traffic conditions; and a statistical processor for statistically processing outputs of the arrival direction estimating unit to determine the beam direction and the beamwidth.

16. The transmitter of claim 13, further comprising:

a storage unit for previously storing the beam direction and the beamwidth, wherein the beam direction and the beamwidth are read from the storage unit.

17. A transmitter comprising:

a circular array antenna comprising a plurality of antenna elements disposed circularly;

a coefficient calculator for calculating excitation coefficients for the circular array antenna based on a beam direction and a beamwidth of a desired antenna pattern;

a plurality of transmit beam formers, each of the transmit beam formers for splitting a transmit signal into signals, the number of which is the same as the number of antenna elements of the circular array antenna, and respectively multiplying the signals by the coefficients thereby to form transmit beams; and a transmit frequency converter for converting the transmit beams of each of the transmit beam formers to either intermediate frequency signals or baseband signals, wherein the transmit beam formers are coupled in parallel to the transmit frequency converter, wherein the coefficient calculator is commonly coupled to the transmit beam formers, and wherein the coefficient calculator comprises means for setting the number of beams which is equal to the number of transmit beam formers.

18. The transmitter of claim 17, wherein the coefficient calculator comprises means for setting an antenna power of each of the beams.

19. A transmitter comprising:

a circular array antenna comprising a plurality of antenna elements disposed circularly;

a coefficient calculator for calculating excitation coefficients for the circular array antenna based on a beam direction and a beamwidth of a desired antenna pattern;

a plurality of transmit beam formers, each of the transmit beam formers for splitting a transmit signal into signals, the number of which is the same as the number of antenna elements of the circular array antenna, and respectively multiplying the signals by the coefficients thereby to form transmit beams; and a plurality of transmit frequency converters, each of the transmit frequency converters for converting the transmit beams of the corresponding transmit beam former to either intermediate frequency signals or baseband signals, wherein the combinations of the transmit frequency converter and the transmit beam former are coupled in parallel to the circular array antenna, wherein the coefficient calculator is commonly coupled to the transmit beam formers, and wherein the coefficient calculator comprises means for setting the number of beams which is equal to the number of transmit beam formers.

20. The transmitter of claim 19, wherein the coefficient calculator comprises means for setting an antenna power of each of the beams.

21. A radio unit for use with a circular antenna having a plurality of antenna elements disposed circularly, said radio unit comprising:

a calculator for establishing an antenna pattern of said circular antenna based on at least one of an arbitrary beam direction and an arbitrary beam width of a desired antenna pattern;

a receive frequency converter for converting radio frequency signals received by the circular antenna to either intermediate frequency signals or baseband signals;

a receive beam former for respectively multiplying either the intermediate frequency signals or the baseband signals by coefficients calculated by the coefficient calculator and combining resultant signals;

a transmit beam former for splitting a transmit signal into signals, the number of which is the same as the number of antenna elements of the circular array antenna, and respectively multiplying the signals by the coefficients thereby to form transmit beams; and a transmit frequency converter for converting the transmit beams of the transmit beam former to either intermediate frequency signals or baseband signals, wherein the calculator is commonly coupled to the receive beam former and the transmit beam former.

22. The radio unit of claim 21, further comprising:

an arrival direction estimating unit for estimating arrival directions of incoming radio waves in relation to traffic conditions; and a statistical processor for statistically processing outputs of the arrival direction estimating unit to determine the beam direction and the beamwidth.

23. The radio unit of claim 21, further comprising:

a storage unit for previously storing the beam direction and the beamwidth, wherein the beam direction and the beamwidth are read from the storage unit.

* * * * *